United States Patent
Belzile (10) Patent No.: US 12,384,535 B2
(45) Date of Patent: Aug. 12, 2025

(54) SYSTEM FOR A VERTICAL TAKEOFF AND LANDING AIRCRAFT WITH AN IN-BOOM LIFT PROPULSOR

(71) Applicant: BETA AIR LLC, South Burlington, VT (US)

(72) Inventor: Manon Danielle Belzile, Fairfield, VT (US)

(73) Assignee: BETA AIR LLC, South Burlington, VT (US)

( * ) Notice: Subject to any disclaimer, the term of this patent is extended or adjusted under 35 U.S.C. 154(b) by 89 days.

(21) Appl. No.: 18/201,520

(22) Filed: May 24, 2023

(65) Prior Publication Data

US 2023/0312090 A1    Oct. 5, 2023

Related U.S. Application Data

(63) Continuation-in-part of application No. 17/564,404, filed on Dec. 29, 2021, now Pat. No. 11,702,200.

(51) Int. Cl.
| | |
|---|---|
| B64C 29/00 | (2006.01) |
| B64D 29/00 | (2006.01) |
| B64D 29/08 | (2006.01) |
| H02K 11/33 | (2016.01) |
| H02K 21/16 | (2006.01) |

(52) U.S. Cl.
CPC .......... *B64C 29/0025* (2013.01); *B64D 29/00* (2013.01); *B64D 29/08* (2013.01); *H02K 11/33* (2016.01); *H02K 21/16* (2013.01)

(58) Field of Classification Search
CPC .... B64C 29/0025; B64D 27/24; B64D 29/00; B64D 29/08

USPC ............................................................. 244/6
See application file for complete search history.

(56) References Cited

U.S. PATENT DOCUMENTS

| | | | | |
|---|---|---|---|---|
| 2,917,643 | A * | 12/1959 | Mihanowich | H02K 15/024 310/216.096 |
| 6,974,105 | B2 * | 12/2005 | Pham | B64C 27/28 244/6 |
| 7,143,973 | B2 * | 12/2006 | Ballew | B64C 27/28 244/6 |
| 8,016,233 | B2 * | 9/2011 | Moore | B64C 5/08 244/119 |
| 9,783,288 | B1 * | 10/2017 | Moore | H01F 7/0226 |
| 10,625,843 | B2 * | 4/2020 | Benson | B64U 30/10 |
| 10,814,995 | B2 * | 10/2020 | West | B64D 27/18 |
| 10,894,593 | B2 * | 1/2021 | Benson | B64U 50/13 |
| 10,894,599 | B1 * | 1/2021 | Popiks | B64C 27/30 |
| 10,981,670 | B2 * | 4/2021 | Garvin | B64C 39/024 |

(Continued)

*Primary Examiner* — Brady W Frazier
(74) *Attorney, Agent, or Firm* — Brake Hughes Bellermann LLP (57) ABSTRACT

An aircraft with an in-boom lift propulsor includes a fuselage, a boom with a recess in the upper surface, and a lift propulsor comprising of a motor assembly and a propulsive element. Motor on the aircraft is operated through an interaction between the motor's magnetic field and electric current in a wire winding to generate force on a shaft of the motor. The in-boom lift propulsor helps prevent damages to the motor assembly and the aircraft by absorbing torque from the rotor and absorbing moment from the mating flange, where the mating flange joins the motor assembly to the boom. The boom includes an access panel to service the motor assembly and invertor during maintenance.

17 Claims, 5 Drawing Sheets

(56) References Cited

U.S. PATENT DOCUMENTS

| | | | |
|---|---|---|---|
| 11,091,258 B2* | 8/2021 | Groninga | B64C 29/0033 |
| 2014/0217234 A1* | 8/2014 | Dezeustre | B64D 27/10 |
| | | | 244/54 |
| 2014/0231582 A1* | 8/2014 | Headrick | B64U 10/13 |
| | | | 244/54 |
| 2017/0240273 A1* | 8/2017 | Yuen | B64C 29/0033 |
| 2019/0382106 A1* | 12/2019 | Prager | B64C 29/0025 |
| 2020/0079501 A1* | 3/2020 | Graves | B64C 27/30 |
| 2020/0108918 A1* | 4/2020 | Douglas | B64C 29/0033 |
| 2020/0299002 A1* | 9/2020 | Nielsen | G05B 23/0286 |
| 2020/0317328 A1* | 10/2020 | Bevirt | B64D 27/357 |
| 2020/0346747 A1* | 11/2020 | Lukaczyk | B64U 50/19 |
| 2020/0385130 A1* | 12/2020 | Verna | B64U 30/20 |
| 2020/0385139 A1* | 12/2020 | Verna | B64D 27/34 |
| 2021/0221527 A1* | 7/2021 | Thrun | B64D 35/06 |
| 2021/0300550 A1* | 9/2021 | Owen | B64C 7/00 |
| 2021/0317835 A1* | 10/2021 | Sawata | H02K 9/00 |
| 2022/0043465 A1* | 2/2022 | Vander Mey | G05D 1/46 |

* cited by examiner

SYSTEM FOR A VERTICAL TAKEOFF AND LANDING AIRCRAFT WITH AN IN-BOOM LIFT PROPULSOR

CROSS-REFERENCE TO RELATED APPLICATIONS

This application is a continuation-in-part of Nonprovisional application Ser. No. 17/564,404 filed on Dec. 29, 2021, and entitled "SYSTEM FOR A VERTICAL TAKEOFF AND LANDING AIRCRAFT WITH AN IN-BOOM LIFT PROPULSOR," the entirety of which is incorporated herein by reference.

FIELD OF THE INVENTION

The present invention generally relates to the field of vertical takeoff and landing aircraft. In particular, the present invention is directed to a system for a vertical takeoff and landing aircraft with an in-boom lift propulsor.

BACKGROUND

In vertical takeoff and landing aircrafts, the engine assembly are often housed outside of the boom. This means that the engine assembly is often exposed to the elements and are more susceptible to damage. Design of the engine assembly must be done in a manner to mitigate these issues. Existing approaches to the problem are limited.

SUMMARY OF THE DISCLOSURE

In an aspect, a vertical takeoff and landing aircraft is provided. The aircraft includes a fuselage. The aircraft includes a boom attached to a wing of the aircraft, wherein the boom is oriented substantially parallel to the fuselage, the boom having an upper surface, wherein the upper surface includes a recess that houses a lift motor. The lift motor includes a stator, the stator including a plurality of windings having a plurality of end turns. The lift motor includes a rotor located substantially coaxially with the stator, the rotor including a plurality of magnets, wherein the rotor is configured to rotate relative to the stator. The lift motor includes a mount affixing the stator to the boom. The lift motor includes at least an air passage proximal the plurality of windings and configured to receive an airflow from an input on the upper surface of the boom, direct the airflow adjacent at least a portion of the plurality of windings, and deliver the airflow to an output of the boom. The lift motor includes a shaft operatively connected to the rotor, the shaft configured to rotate with the rotor. The aircraft includes a propulsive element affixed to the shaft and configured to produce a lifting thrust.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems for an in-boom propulsor. In an embodiment, a vertical takeoff and landing aircraft comprises of a fuselage, a boom, and a lift propulsor within the boom. The boom, provided in this disclosure, may protect the propulsor and motor assembly from damages that may happen during flight. The boom may include an access panel for the motor invertors for servicing. Exemplary embodiments illustrating aspects of the present disclosure are described below in the context of several specific examples.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

Figure 1:
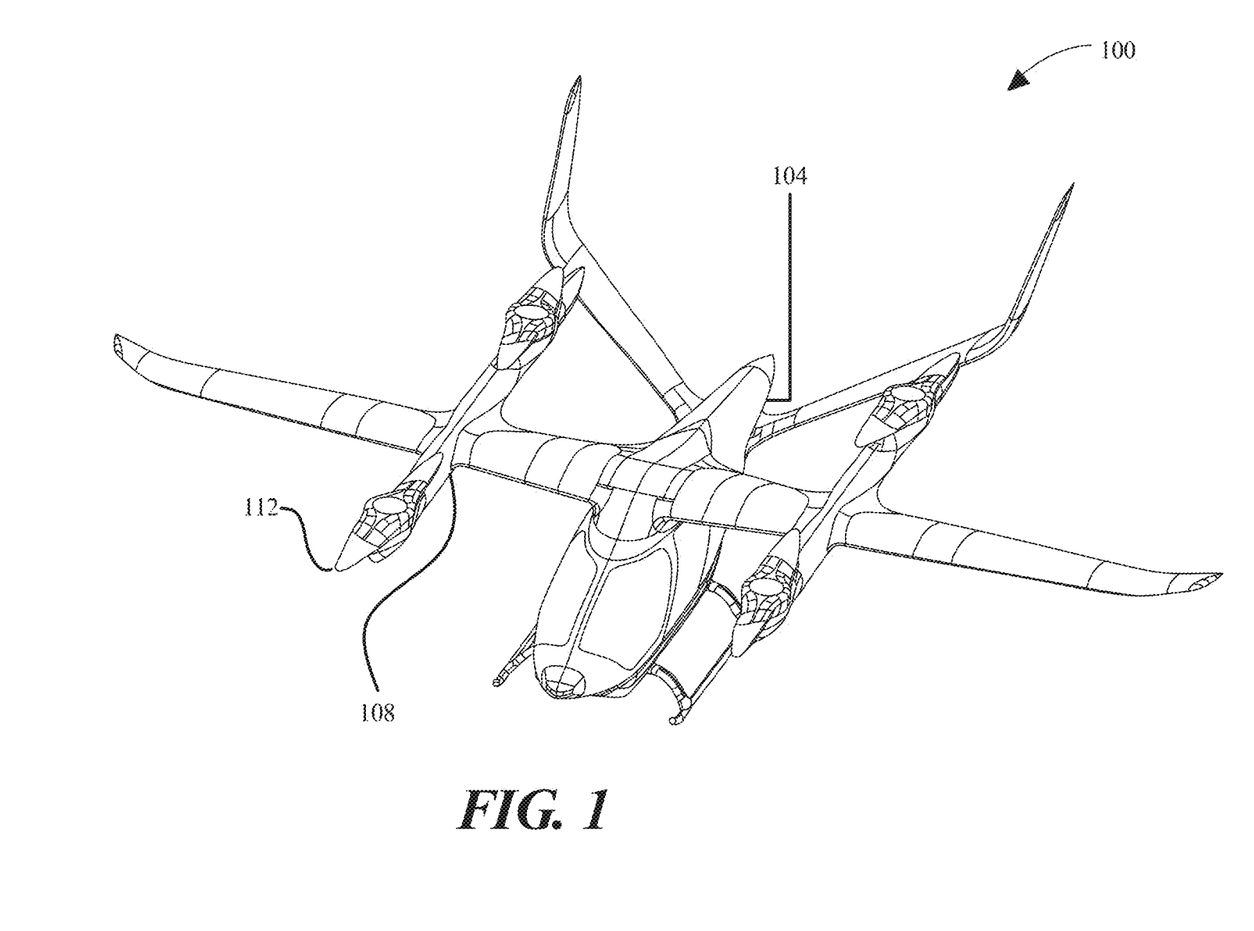
FIG. 1 is a diagram of a vertical takeoff and landing aircraft.

Referring now to the drawings, FIG. 1 illustrates an exemplary embodiment of a vertical takeoff and landing aircraft 100. Aircraft 100 includes a fuselage 104, boom 108, and propulsor 112. As used in this disclosure a "fuselage" is the main body of an aircraft, or in other words, the entirety of the aircraft except for the cockpit, nose, wings, empennage, nacelles, any and all control surfaces, and generally contains an aircraft's payload. Fuselage 104 may comprise structural elements that physically support the shape and structure of an aircraft. Structural elements may take a plurality of forms, alone or in combination with other types. Structural elements may vary depending on the construction type of aircraft and specifically, the fuselage. Fuselage 104 may comprise a truss structure. A truss structure may be used with a lightweight aircraft and may include welded aluminum tube trusses. A truss, as used herein, is an assembly of beams that create a rigid structure, often in combinations of triangles to create three-dimensional shapes. A truss structure may alternatively comprise titanium construction in place of aluminum tubes, or a combination thereof. In some embodiments, structural elements may comprise aluminum tubes and/or titanium beams. In an embodiment, and without limitation, structural elements may include an aircraft skin. Aircraft skin may be layered over the body shape constructed by trusses. Aircraft skin may comprise a plurality of materials such as aluminum, fiberglass, and/or carbon fiber, the latter of which will be addressed in greater detail later in this paper.

In embodiments, and with continued reference to FIG. 1, aircraft fuselage 104 may include and/or be constructed using geodesic construction. Geodesic structural elements may include stringers wound about formers (which may be alternatively called station frames) in opposing spiral directions. A "stringer," as used in this disclosure, is a general structural element that may include a long, thin, and rigid strip of metal or wood that is mechanically coupled to and spans a distance from, station frame to station frame to create an internal skeleton on which to mechanically couple aircraft skin. A former (or station frame) may include a rigid structural element that is disposed along a length of an interior of aircraft fuselage 104 orthogonal to a longitudinal (nose to tail) axis of the aircraft and may form a general shape of fuselage 104. A former may include differing cross-sectional shapes at differing locations along fuselage 104, as the former is the structural element that informs the overall shape of a fuselage 104 curvature. In embodiments, aircraft skin may be anchored to formers and strings such that the outer mold line of a volume encapsulated by formers and stringers includes the same shape as aircraft 100 when installed. In other words, former(s) may form a fuselage's ribs, and the stringers may form the interstitials between such ribs. The spiral orientation of stringers about formers may provide uniform robustness at any point on an aircraft fuselage such that if a portion sustains damage, another portion may remain largely unaffected. Aircraft skin may be attached to underlying stringers and formers and may interact with a fluid, such as air, to generate lift and perform maneuvers.

In an embodiment, and still referring to FIG. 1, fuselage 104 may include and/or be constructed using monocoque construction. Monocoque construction may include a primary structure that forms a shell (or skin in an aircraft's case) and supports physical loads. Monocoque fuselages are fuselages in which the aircraft skin or shell is also the primary structure. In monocoque construction aircraft skin would support tensile and compressive loads within itself and true monocoque aircraft can be further characterized by the absence of internal structural elements. Aircraft skin in this construction method is rigid and can sustain its shape with no structural assistance form underlying skeleton-like elements. Monocoque fuselage may include aircraft skin made from plywood layered in varying grain directions, epoxy-impregnated fiberglass, carbon fiber, or any combination thereof.

According to embodiments, and further referring to FIG. 1, fuselage 104 may include a semi-monocoque construction. Semi-monocoque construction, as used herein, is a partial monocoque construction, wherein a monocoque construction is describe above detail. In semi-monocoque construction, aircraft fuselage 104 may derive some structural support from stressed aircraft skin and some structural support from underlying frame structure made of structural elements. Formers or station frames can be seen running transverse to the long axis of fuselage 104 with circular cutouts which are generally used in real-world manufacturing for weight savings and for the routing of electrical harnesses and other modern on-board systems. In a semi-monocoque construction, stringers are thin, long strips of material that run parallel to fuselage's long axis. Stringers may be mechanically coupled to formers permanently, such as with rivets. Aircraft skin may be mechanically coupled to stringers and formers permanently, such as by rivets as well. A person of ordinary skill in the art will appreciate, upon reviewing the entirety of this disclosure, that there are numerous methods for mechanical fastening of components like screws, nails, dowels, pins, anchors, adhesives like glue or epoxy, or bolts and nuts, to name a few. A subset of fuselage under the umbrella of semi-monocoque construction includes unibody vehicles. Unibody, which is short for "unitized body" or alternatively "unitary construction", vehicles are characterized by a construction in which the body, floor plan, and chassis form a single structure. In the aircraft world, unibody may be characterized by internal structural elements like formers and stringers being constructed in one piece, integral to the aircraft skin as well as any floor construction like a deck.

Still referring to FIG. 1, stringers and formers, which may account for the bulk of an aircraft structure excluding monocoque construction, may be arranged in a plurality of orientations depending on aircraft operation and materials. Stringers may be arranged to carry axial (tensile or compressive), shear, bending or torsion forces throughout their overall structure. Due to their coupling to aircraft skin, aerodynamic forces exerted on aircraft skin will be transferred to stringers. A location of said stringers greatly informs the type of forces and loads applied to each and every stringer, all of which may be handled by material selection, cross-sectional area, and mechanical coupling methods of each member. A similar assessment may be made for formers. In general, formers may be significantly larger in cross-sectional area and thickness, depending on location, than stringers. Both stringers and formers may include aluminum, aluminum alloys, graphite epoxy composite, steel alloys, titanium, or an undisclosed material alone or in combination.

In an embodiment, and still referring to FIG. 1, stressed skin, when used in semi-monocoque construction is the concept where the skin of an aircraft bears partial, yet significant, load in an overall structural hierarchy. In other words, an internal structure, whether it be a frame of welded tubes, formers and stringers, or some combination, may not be sufficiently strong enough by design to bear all loads. The concept of stressed skin may be applied in monocoque and semi-monocoque construction methods of fuselage 104. Monocoque includes only structural skin, and in that sense, aircraft skin undergoes stress by applied aerodynamic fluids imparted by the fluid. Stress as used in continuum mechanics may be described in pound-force per square inch (lbf/in2) or Pascals (Pa). In semi-monocoque construction stressed skin may bear part of aerodynamic loads and additionally may impart force on an underlying structure of stringers and formers.

Aircraft 100 further comprises an electric vertical takeoff and landing aircraft. As used herein, a vertical take-off and landing (VTOL) aircraft is one that can hover, take off, and land vertically. An eVTOL, as used herein, is an electrically powered aircraft typically using an energy source, of a plurality of energy sources to power the aircraft. In order to optimize the power and energy necessary to propel the aircraft. eVTOL may be capable of rotor-based cruising flight, rotor-based takeoff, rotor-based landing, fixed-wing cruising flight, airplane-style takeoff, airplane-style landing, and/or any combination thereof. Rotor-based flight, as described herein, is where the aircraft generated lift and propulsion by way of one or more powered rotors coupled with an engine, such as a "quad copter," multi-rotor helicopter, or other vehicle that maintains its lift primarily using downward thrusting propulsors. Fixed-wing flight, as described herein, is where the aircraft is capable of flight using wings and/or foils that generate lift caused by the aircraft's forward airspeed and the shape of the wings and/or foils, such as airplane-style flight. Boom 108 is located on aircraft 100, attached and adjacent to the fuselage 104. As used in this disclosure, a "boom" is an element that projects essentially horizontally from fuselage, including a laterally extending element, an outrigger, a spar, a lifting body, and/or a fixed wing that extends from fuselage 104. For the purposes of this disclosure, a "lifting body" is a structure that creates lift using aerodynamics. Boom 108 may extend perpendicularly to the fuselage 104. Aircraft 100 comprises at least one motor assembly and at least one boom to house said motor assembly. Motor assembly may be comprised of an electric, gas, etc. motor. Motor is driven by electric power wherein power have varying or reversing voltage levels. For example, motor may be driven by alternating current (AC) wherein power is produced by an alternating current generator or inverter. A propulsor may be attached to a motor assembly. Propulsor 112 is a component and/or device used to propel a craft by exerting force on a fluid medium, which may include a gaseous medium such as air or a liquid medium such as water. In an embodiment, when a propulsor twists and pulls air behind it, it may, at the same time, push an aircraft forward with an amount of force and/or thrust. More air pulled behind an aircraft results in greater thrust with which the aircraft is pushed forward. Propulsor component may include any device or component that consumes electrical power on demand to propel an electric aircraft in a direction or other vehicle while on ground or in-flight. In an embodiment, propulsor component may include a puller component. As used in this disclosure a "puller component" is a component that pulls and/or tows an aircraft through a medium. As a non-limiting example, puller component may include a flight component such as a puller propeller, a puller motor, a puller propulsor, and the like. Additionally, or alternatively, puller component may include a plurality of puller flight components. In another embodiment, propulsor component may include a pusher component. As used in this disclosure a "pusher component" is a component that pushes and/or thrusts an aircraft through a medium. As a non-limiting example, pusher component may include a pusher component such as a pusher propeller, a pusher motor, a pusher propulsor, and the like. Additionally, or alternatively, pusher flight component may include a plurality of pusher flight components.

In another embodiment, and still referring to FIG. 1, propulsor 112 may include a propeller, a blade, or any combination of the two. A propeller may function to convert rotary motion from an engine or other power source into a swirling slipstream which may push the propeller forwards or backwards. Propulsor 112 may include a rotating power-driven hub, to which several radial airfoil-section blades may be attached, such that an entire whole assembly rotates about a longitudinal axis. As a non-limiting example, blade pitch of propellers may be fixed at a fixed angle, manually variable to a few set positions, automatically variable (e.g., a "constant-speed" type), and/or any combination thereof as described further in this disclosure. As used in this disclosure a "fixed angle" is an angle that is secured and/or substantially unmovable from an attachment point. For example, and without limitation, a fixed angle may be an angle of 2.2° inward and/or 1.7° forward. As a further non-limiting example, a fixed angle may be an angle of 3.6° outward and/or 2.7° backward. In an embodiment, propellers for an aircraft may be designed to be fixed to their hub at an angle similar to the thread on a screw makes an angle to the shaft; this angle may be referred to as a pitch or pitch angle which may determine a speed of forward movement as the blade rotates. Additionally or alternatively, propulsor component may be configured having a variable pitch angle. As used in this disclosure a "variable pitch angle" is an angle that may be moved and/or rotated. For example, and without limitation, propulsor component may be angled at a first angle of 3.3° inward, wherein propulsor component may be rotated and/or shifted to a second angle of 1.7° outward.

Still referring to FIG. 1, propulsor 112 may include a thrust element which may be integrated into the propulsor. Thrust element may include, without limitation, a device using moving or rotating foils, such as one or more rotors, an airscrew or propeller, a set of airscrews or propellers such as contra-rotating propellers, a moving or flapping wing, or the like. Further, a thrust element, for example, can include without limitation a marine propeller or screw, an impeller, a turbine, a pump-jet, a paddle or paddle-based device, or the like.

Figure 2:
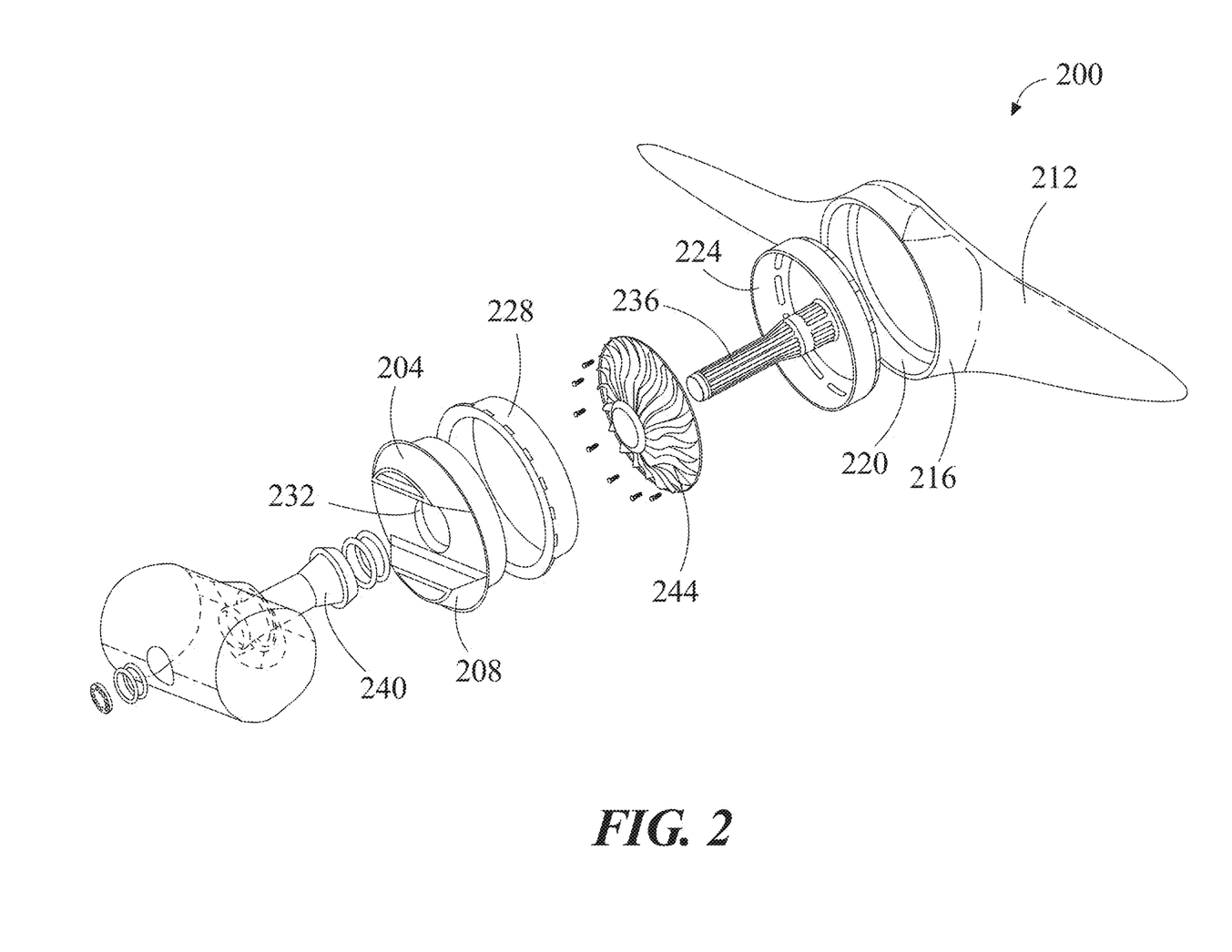
FIG. 2 is an illustration showing an exploded view of an exemplary embodiment of a motor assembly in a propulsion system in one or more aspects of the present disclosure.

Referring now to FIG. 2, an exploded view of an exemplary embodiment of a motor assembly 200. Motor assembly 200 includes at least a stator 204. Stator 204, as used herein, is a stationary component of a motor and/or motor assembly. In an embodiment, stator 204 includes at least a first magnetic element 208. As used herein, first magnetic element 208 is an element that generates a magnetic field. For example, first magnetic element 208 may include one or more magnets which may be assembled in rows along a structural casing component. Further, first magnetic element 208 may include one or more magnets having magnetic poles oriented in at least a first direction. The magnets may include at least a permanent magnet. Permanent magnets may be composed of, but are not limited to, ceramic, alnico, samarium cobalt, neodymium iron boron materials, any rare earth magnets, and the like. Further, the magnets may include an electromagnet. As used herein, an electromagnet is an electrical component that generates magnetic field via induction; the electromagnet may include a coil of electrically conducting material, through which an electric current flow to generate the magnetic field, also called a field coil of field winding. A coil may be wound around a magnetic core, which may include without limitation an iron core or other magnetic material. The core may include a plurality of steel rings insulated from one another and then laminated together; the steel rings may include slots in which the conducting wire will wrap around to form a coil. A first magnetic element 208 may act to produce or generate a magnetic field to cause other magnetic elements to rotate, as described in further detail below. Stator 204 may include a frame to house components including at least a first magnetic element 208, as well as one or more other elements or components as described in further detail below. In an embodiment, a magnetic field can be generated by a first magnetic element 208 and can comprise a variable magnetic field. In embodiments, a variable magnetic field may be achieved by use of an inverter, a controller, or the like. In an embodiment, stator 204 comprises an inner and outer cylindrical surface; a plurality of magnetic poles may extend outward from the outer cylindrical surface of the stator. Inner cylindrical surface and outer cylindrical surface are coaxial about an axis of rotation. The stator is explained with further detail in FIG. 3. In an embodiment, stator 204 may include an annular stator, wherein the stator is ring-shaped. In an embodiment, stator 204 may be incorporated into a DC motor where stator 204 is fixed and functions to supply the magnetic fields where a corresponding rotor 316, as described in further detail below, rotates.

Still referring to FIG. 2, motor assembly 200 includes propulsor 112. In embodiments, propulsor 112 can include an integrated rotor. As used herein, a rotor is a portion of an electric motor that rotates with respect to a stator of the electric motor, such as stator 204. A propulsor, as used herein, is a component or device used to propel a craft by exerting force on a fluid medium, which may include a gaseous medium such as air or a liquid medium such as water. Propulsor 112 may be any device or component that consumes electrical power on demand to propel an aircraft or other vehicle while on ground and/or in flight. Propulsor 112 may include one or more propulsive devices. In an embodiment, propulsor 112 can include a thrust element, which may be integrated into the propulsor. A thrust element may include any device or component that converts the mechanical energy of a motor, for instance in the form of rotational motion of a shaft, into thrust in a fluid medium. For example, a thrust element may include without limitation a marine propeller or screw, an impeller, a turbine, a pump-jet, a paddle or paddle-based device, or the like. As another non-limiting example, at least a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as at least a thrust element. As used herein, a propulsive device may include, without limitation, a device using moving or rotating foils, including without limitation one or more rotors, an airscrew or propeller, a set of airscrews or propellers such as contra-rotating propellers, a moving or flapping wing, or the like.

In an embodiment, propulsor 112 may include at least a blade. As another non-limiting example, a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as propulsor 112. In an embodiment, when a propulsor twists and pulls air behind it, it will, at the same time, push the aircraft forward with an equal amount of force. The more air pulled behind the aircraft, the more the aircraft is pushed forward.

In an embodiment, thrust element may include a helicopter rotor incorporated into propulsor 112. A helicopter rotor, as used herein, may include one or more blade or wing elements driven in a rotary motion to drive fluid medium in a direction axial to the rotation of the blade or wing element. Its rotation is due to the interaction between the windings and magnetic fields which produces a torque around the rotor's axis. A helicopter rotor may include a plurality of blade or wing elements.

Continuing to refer to FIG. 2, propulsor 112 can include a hub 216 rotatably mounted to stator 204. Rotatably mounted, as described herein, is functionally secured in a manner to allow rotation. Hub 216 is a structure which allows for the mechanically coupling of components of the integrated rotor assembly. In an embodiment, hub 216 can be mechanically coupled to propellers or blades. In an embodiment, hub 216 may be cylindrical in shape such that it may be mechanically joined to other components of the rotor assembly. Hub 216 may be constructed of any suitable material or combination of materials, including without limitation metal such as aluminum, titanium, steel, or the like, polymer materials or composites, fiberglass, carbon fiber, wood, or any other suitable material. Hub 216 may move in a rotational manner driven by interaction between stator 204 and components in the rotor assembly. Persons skilled in the art, upon reviewing the entirety of this disclosure, will be aware of various structures that may be used as or included as hub 216, as used and described herein.

Still referring to FIG. 2, propulsor 112 comprises a second magnetic element 220, which may include one or more further magnetic elements. Second magnetic element 220 generates a magnetic field designed to interact with first magnetic element 208. Second magnetic element 220 may be designed with a material such that the magnetic poles of at least a second magnetic element are oriented in an opposite direction from first magnetic element 208. In an embodiment, second magnetic element 220 may be affixed to hub 216. Affixed, as described herein, is the attachment, fastening, connection, and the like, of one component to another component. For example and without limitation, affixed may include bonding the second magnetic element 220 to hub 216, such as through hardware assembly, spot welding, riveting, brazing, soldering, glue, and the like. Second magnetic element 220 may include any magnetic element suitable for use as a first magnetic element 208. For instance, and without limitation, second magnetic element may include a permanent magnet and/or an electromagnet. Second magnetic element 220 may include magnetic poles oriented in a second direction opposite of the orientation of the poles of first magnetic element 208. In an embodiment, motor assembly 200 incorporates stator 204 with a first magnet element and second magnetic element 220. First magnetic element 208 includes magnetic poles oriented in a first direction, a second magnetic element includes a plurality of magnetic poles oriented in the opposite direction than the plurality of magnetic poles in the first magnetic element 208.

Continuing to refer to FIG. 2, second magnetic element 220 may include a plurality of magnets attached to or integrated in hub 216. In an embodiment, hub 216 may incorporate structural elements of the rotor assembly of the motor assembly. As a non-limiting example hub 216 may include a motor inner magnet carrier 224 and motor outer magnet carrier 228 incorporated into the hub 216 structure. In an embodiment motor inner magnet carrier 224 and motor outer magnet carrier 228 may be cylindrical in shape. In an embodiment, motor inner magnet carrier 224 and motor out magnet carrier 216 may be any shape that would allow for a fit with the other components of the rotor assembly. In an embodiment, hub 216 may be short and wide in shape to reduce the profile height of the rotating assembly of motor assembly 200. Reducing the profile assembly height may have the advantage of reducing drag force on the external components. In an embodiment, hub 216 may also be cylindrical in shape so that fitment of the components in the rotor assembly are structurally rigid while leaving hub 216 free to rotate about stator 204.

In an embodiment, motor outer magnet carrier 228 may have a slightly larger diameter than motor inner magnet carrier 224, or vice-versa. First magnetic element 208 may be a productive element, defined herein as an element that produces a varying magnetic field. Productive elements will produce magnetic field that will attract and other magnetic elements, including a receptive element. Second magnetic element may be a productive or receptive element. A receptive element will react due to the magnetic field of a first magnetic element 208. In an embodiment, first magnetic element 208 produces a magnetic field according to magnetic poles of first magnetic element 208 oriented in a first direction. Second magnetic element 220 may produce a magnetic field with magnetic poles in the opposite direction of the first magnetic field, which may cause the two magnetic elements to attract one another. Receptive magnetic element may be slightly larger in diameter than the productive element. Interaction of productive and receptive magnetic elements may produce torque and cause the assembly to rotate. Hub 216 and rotor assembly may both be cylindrical in shape where rotor may have a slightly smaller circumference than hub 216 to allow the joining of both structures. Coupling of hub 216 to stator 204 may be accomplished via a surface modification of either hub 216, stator 204 or both to form a locking mechanism. Coupling may be accomplished using additional nuts, bolts, and/or other fastening apparatuses. In an embodiment, an integrated rotor assembly as described above reduces profile drag in forward flight for an electric aircraft. Profile drag may be caused by a number of external forces that the aircraft is subjected to. By incorporating a propulsor 112 into hub 216, a profile of motor assembly 200 may be reduced, resulting in a reduced profile drag, as noted above. In an embodiment, the rotor, which includes motor inner magnet carrier 224, motor outer magnet carrier 228, propulsor 112 is incorporated into hub 216 to become one integrated unit. In an embodiment, inner motor magnet carrier 224 rotates in response to a magnetic field. The rotation causes hub 216 to rotate. This unit can be inserted into motor assembly 200 as one unit. This enables ease of installation, maintenance and removal.

Still referring to FIG. 2, stator 204 may include a through-hole 232. Through-hole 232 may provide an opening for a component to be inserted through to aid in attaching propulsor 112 with integrated rotor to stator. In an embodiment, through-hole 232 may have a round or cylindrical shape and be located at a rotational axis of stator 204. Hub 216 may be mounted to stator 204 by means of a shaft 236 rotatably inserted though through hole 232. Through-hole 232 may have a diameter that is slightly larger than a diameter of shaft 236 to allow shaft 236 to fit through through-hole 232 in order to connect stator 204 to hub 216. Shaft 236 may rotate in response to rotation of propulsor 112.

Still referring to FIG. 2, motor assembly 200 may include a bearing cartridge 240. Bearing cartridge 240 may include a bore. Shaft 236 may be inserted through the bore of bearing cartridge 240. Bearing cartridge 240 may be attached to a structural element of a vehicle. Bearing cartridge 240 functions to support the rotor and to transfer the loads from the motor. Loads may include, without limitation, weight, power, magnetic pull, pitch errors, out of balance situations, and the like. A bearing cartridge 240 may include a smooth metal ball or roller that rolls against a smooth inner and outer metal surface. The rollers or balls take the load, allowing the device to spin. A bearing may include, without limitation, a ball bearing, a straight roller bearing, a tapered roller bearing or the like. A bearing cartridge 240 may be subject to a load which may include, without limitation, a radial or a thrust load. Depending on the location of bearing cartridge 240 in the assembly, it may see all of a radial or thrust load or a combination of both. In an embodiment, bearing cartridge 240 may join motor assembly 200 to a structure feature. A bearing cartridge 240 may function to minimize the structural impact from the transfer of bearing loads during flight and/or to increase energy efficiency and power of propulsor 112. A bearing cartridge 240 may include a shaft and collar arrangement, wherein a shaft affixed into a collar assembly. A bearing element may support the two joined structures by reducing transmission of vibration from such bearings. Roller (rolling-contact) bearings are conventionally used for locating and supporting machine parts such as rotors or rotating shafts. Typically, the rolling elements of a roller bearing are balls or rollers. In general, a roller bearing is a is type of anti-friction bearing; a roller bearing functions to reduce friction allowing free rotation. Also, a roller bearing may act to transfer loads between rotating and stationary members. In an embodiment, bearing cartridge 240 may act to keep a propulsor 112 and components intact during flight by allowing motor assembly 200 to rotate freely while resisting loads such as an axial force. In an embodiment, bearing cartridge 240 includes a roller bearing incorporated into the bore. A roller bearing is in contact with propulsor shaft 236. Stator 204 is mechanically coupled to inverter housing 240. Mechanically coupled may include a mechanical fastening, without limitation, such as nuts, bolts or other fastening device. Mechanically coupled may include welding or casting or the like. Inverter housing contains a bore which allows insertion by propulsor shaft 236 into bearing cartridge 240.

Still referring to FIG. 2, motor assembly 200 may include a rotating assembly and a stationary assembly. Hub 216, motor inner magnet carrier 224 and propulsor shaft 236 may be incorporated into the rotor assembly of motor assembly 200 which make up rotating parts of electric motor, moving between the stator poles and transmitting the motor power. As one integrated part, the rotor assembly may be inserted and removed in one piece. Stator 204 may be incorporated into the stationary part of the motor assembly 200. Stator and rotor may combine to form an electric motor. In embodiment, an electric motor may, for instance, incorporate coils of wire which are driven by the magnetic force exerted by a first magnetic field on an electric current. The function of the motor may be to convert electrical energy into mechanical energy. In operation, a wire carrying current may create at least a first magnetic field with magnetic poles in a first orientation which interacts with a second magnetic field with magnetic poles oriented in the opposite direction of the first magnetic pole direction causing a force that may move a rotor in a direction. For example and without limitation, a first magnetic element 208 in motor assembly 200 may include an active magnet. For instance and without limitation, a second magnetic element may include a passive magnet, a magnet that reacts to a magnetic force generated by a first magnetic element 208. In an embodiment, a first magnet and a second magnet, positioned around the rotor assembly, may generate magnetic fields to affect the position of the rotor relative to the stator. A controller may have an ability to adjust electricity originating from a power supply and, thereby, the magnetic forces generated, to ensure stable rotation of the rotor, independent of the forces induced by the machinery process. Motor assembly 200 may include an impeller 244 coupled with the shaft 236. An impeller, as described herein, is a rotor used to increase or decrease the pressure and flow of a fluid and/or air. Impeller 244 may function to provide cooling to motor assembly 200. Impeller 244 may include varying blade configurations, such as radial blades, non-radial blades, semi-circular blades and airfoil blades, as discussed further in FIG. 5 of this disclosure. Impeller 244 may further include single and/or double-sided configurations. Additional disclosure related to motor assemblies and electric propulsion assemblies can be found in U.S. patent application Ser. No. 16/910,255, filed on Jun. 24, 2021, and entitled "INTEGRATED ELECTRIC PROPULSION ASSEMBLY," the entirety of which is incorporated herein by reference.

Figure 3:
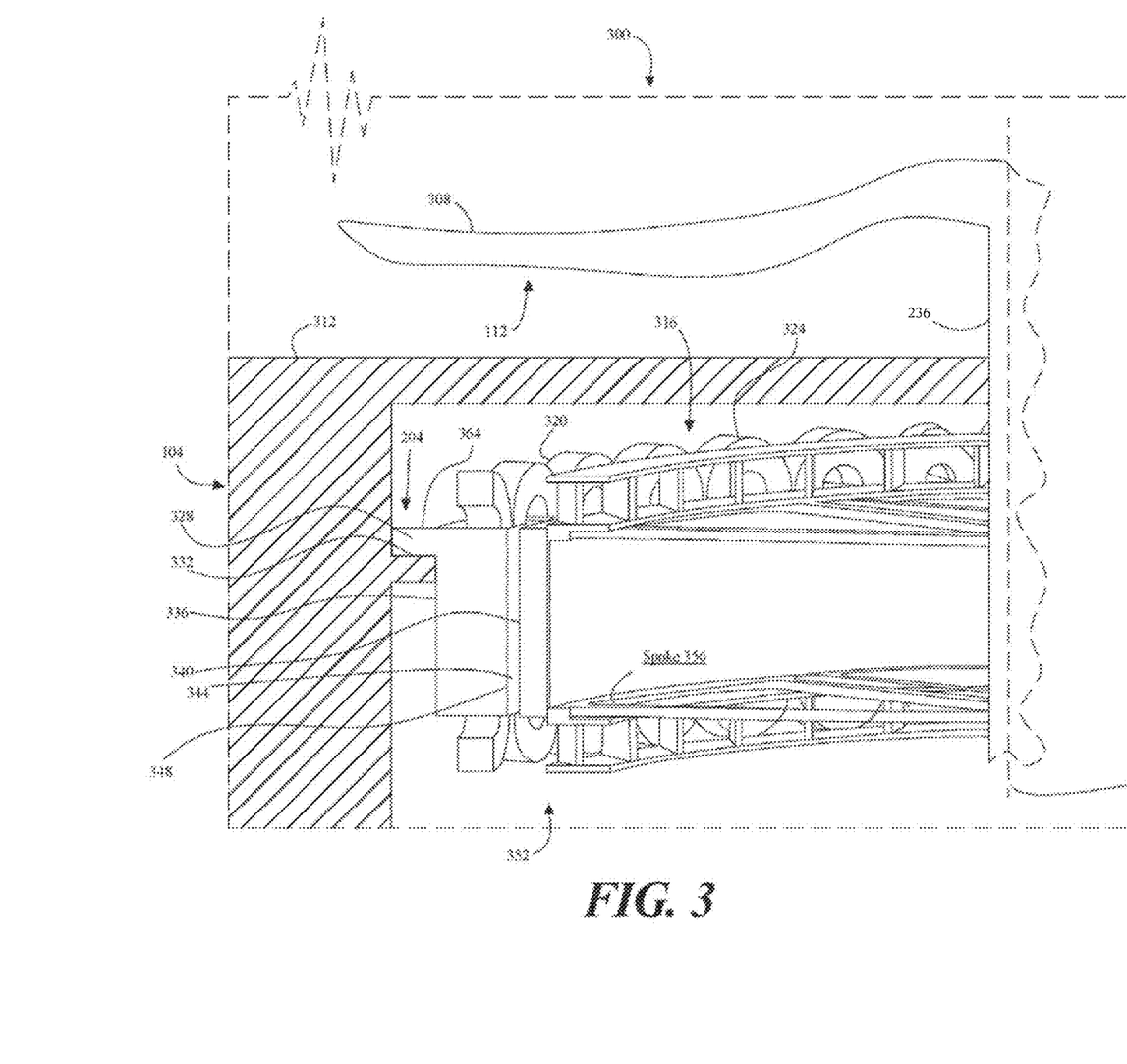
FIG. 3 is a diagram of the cross-sectional view of the boom and motor assembly.

Referring now to FIG. 3, a diagram 300 of the cross-sectional view of a motor assembly 200 in a boom 108. Boom 108 contains a recess 352 on the upper surface of the boom. For example and without limitation, a recess may be radially symmetrical; for instance, part or all of the recess may be substantially cylindrical. As a further nonlimiting example, a recess may closely match the shape of the motor, or other object, within. In an embodiment, a recess may include an open, fully covered, and/or partially covered cavity that houses a motor and/or stator. Recess 352 may include a lip that could be used as a mating surface 332. Recess 352 may include one or more mating surfaces. Mating surface 332 is configured on the recess 352 in boom 108 to contact the mating flange 328. Motor assembly 200 contains a mating flange 328 on stator 204. Mating flange 328 is weld to the boom 108 such that the stator is affixed to aircraft 100. Mating flange 328 can be weld to the boom 108 using standard welding practices such as Arc, MIG (metal, inert gas), TIG (Tungsten Inert Gas), or the like. Mating flange 328 can be fixed to the boom 108 using mechanical methods such as using bolts, rivets, adhesives, and the like. Mating flange 328 may be a structural channel that is configured to resist a moment along an axis of the propulsor shaft. "Moment", as used in this disclosure, is a measure of rotational effort about an axis. Moments may be used to describe rotational efforts acting on static components. In this instance, the mating flange 328 is configured such it resists movement from side to side of a propeller. Mating flange 328 is attached to mating surface 332 using methods mentioned above.

Continuing to refer to FIG. 3, boom 108 includes a nacelle surface 312. As used herein, a "nacelle surface" refers to an aerodynamically formed surface. Motor assembly 300 may be housed within the nacelle surface 312 on the boom 108. The surface may redirect downdrafts as well as updrafts or any other passage of air around or at the boom 108 from a propulsor 112. "Aerodynamic", for the purposes of this disclosure, includes a design for a nacelle that reduces drag and wind resistance as a function of what is housed within. Nacelle surface 312 and boom 108 comprises the same material as the fuselage 104 of the aircraft. Material may be any material suitable for formation of a structural element. Boom 108 may include an opening through which a shaft supporting a rotor 316 and/or portion of a propulsor may pass.

Continuing to refer to FIG. 3, stator 204 includes an inner cylindrical surface 348 and an outer cylindrical surface 336 each coaxial about an axis of rotation 360 and at least partially defined by an axial edge 364 on either side. Stator 204 may comprise stacked laminations, also known as punchings, with inner teeth. An outer surface of the stacked laminations may form outer cylindrical surface 336. Inner cylindrical surface 348 and outer cylindrical surface 336 may share a coincident and parallel centerline disposed at the center of each cylindrical surface. Inner cylindrical surface 348 and outer cylindrical surface 336 may include different radii and thus include different sizes. Stator 204 may include windings 320 made of electrically conductive coil wound around a magnetic core, which may include without limitation an iron core or other magnetic material. Specifically, windings 320 may be wound around the inner teeth of the stacked laminations. Coil may include any material that is conductive to electrical current and may include, as a non-limiting example, various metals such as copper, steel, or aluminum, carbon conducting materials, or any other suitable conductive material. Each of windings 320 may form an oval shape with an end turn 324 on either end of windings 320. End turn 324 may extend past at least an axial edge 364 of stator 204. Each end turn 324 may extend past the corresponding at least an axial edge 364 such that a portion of an interior space of each of windings 320 at least partially extends past both at least an axial edge 364. Stator 204 may include one or more magnets which may be assembled in rows along a structural casing component. Further, stator 204 may include one or more magnets having magnetic poles oriented in at least a first direction. The magnets may include any of the examples discussed above in FIG. 2.

Still referring to FIG. 3, motor 200 includes a rotor 316 coaxial within stator 204. A rotor 316 is a portion of an electric motor that rotates with respect to a stator 204 of the electric motor, such as stator 204. Rotor 316 includes a rotor cylindrical surface 340, wherein the rotor cylindrical surface 340 and inner cylindrical surface 348 of stator 204 combine to form an air gap 164 between the rotor cylindrical surface 340 and the inner cylindrical surface 348. Rotor cylindrical surface 340 may be disposed opposite and opposing to inner cylindrical surface 348 of stator 204. Rotor 316 may include a propulsor shaft 236. Propulsor shaft 236 may be disposed coaxially and coincidentally within stator 204. Propulsor shaft 236 may be rotatable relative to stator 204, which remains stationary relative to electric aircraft 108. Rotor cylindrical surface 340 may be radially spaced from propulsor shaft 236 such as, for example, in a squirrel cage rotor assembly. At least a spoke 356 may extend from propulsor shaft 236 to one or both of axial edge 364 of rotor cylindrical surface 340. At least a spoke 356 may include a plurality of spokes on each of axial edge 364 of rotor cylindrical surface 340. Rotor 316 may include a plurality of permanent magnets, namely a magnet array 344, disposed radially about the axis of rotation 360 of propulsor shaft 236 which may be parallel and coincident with axis of rotation 360 of motor 200. Magnet array 344 may be positioned on rotor cylindrical surface 340 and radially from propulsor shaft 236, such that rotor cylindrical surface 340 is between magnet array 344 and propulsor shaft 236. Magnet array 344 may be opposite inner cylindrical surface 348 of stator 204 and spaced from the inner cylindrical surface 348 by air gap 164. Rotor cylindrical surface 340 may comprise magnet array 344. Magnet array 344 may include a Halbach array. A Halbach array is a special arrangement of permanent magnets that augments the magnetic field on one side of the array while canceling the field to near zero on the other side of the array. For the purposes of this disclosure, a side of the array is defined as an area disposed relative to the array of magnets, for example, if the Halbach array is disposed radially on the cylindrical surface of the propulsor shaft 236, one side may be captured with the Halbach array, and a second side may be the area outside of the Halbach array. In general, the Halbach array is achieved by having a spatially rotating pattern of magnetization where the poles of successive magnets are not necessarily aligned and differ from one to the next. Orientations of magnetic poles may be repeated in patterns or in successive rows, columns, and arrangements. An array, for the purpose of this disclosure is a set, arrangement, or sequence of items, in this case permanent magnets. The rotating pattern of permanent magnets can be continued indefinitely and have the same effect, and may be arranged in rows, columns, or radially, in a non-limiting illustrative embodiment. One of ordinary skill in the art would appreciate that the area that the Halbach array augments the magnetic field of may be configurable or adjustable. Magnet array 344 may comprise a magnet sleeve forming at least part of rotor cylindrical surface 340 with slits and/or ribs in the magnet sleeve to further dissipate heat. Slits and/or ribs may be unidirectional. Slits and/or ribs may be bidirectional on magnet array 344 such as, for example, in a chevron pattern.

Still referring to FIG. 3, an end of propulsor shaft 236 may be attached to a propulsor 204. In an embodiment, propulsor 112 may include at least a propulsor blade 308. At least a propulsor blade 308 may include a plurality of propulsor blades. As another non-limiting example, a propulsor may include an eight-bladed pusher propeller, such as an eight-bladed propeller mounted behind the engine to ensure the drive shaft is in compression. Persons skilled in the art, upon reviewing the entirety of this disclosure, will be aware of various devices that may be used as propulsor 112. In an embodiment, when a propulsor twists and pulls air behind it, it will, at the same time, push the aircraft forward with an equal amount of force. The more air pulled behind the aircraft, the more the aircraft is pushed forward. Thrust element may include a helicopter rotor incorporated into propulsor 112. A helicopter rotor, as used herein, may include one or more blade or wing elements driven in a rotary motion to drive fluid medium in a direction axial to the rotation of the blade or wing element. Its rotation is due to the interaction between the windings 320 and magnetic fields which produces a torque around the rotor's axis. A helicopter rotor may include a plurality of blade or wing elements. Additional disclosure related to motor windings can be found in U.S. patent application Ser. No. 17/154,578, filed on Jan. 1, 2021 and entitled "METHODS AND SYSTEMS FOR A STATOR WITH HELICAL WINDINGS CONFIGURED FOR USE IN ELECTRIC AIRCRAFT MOTOR," the entirety of which is incorporated herein by reference.

Figure 4:
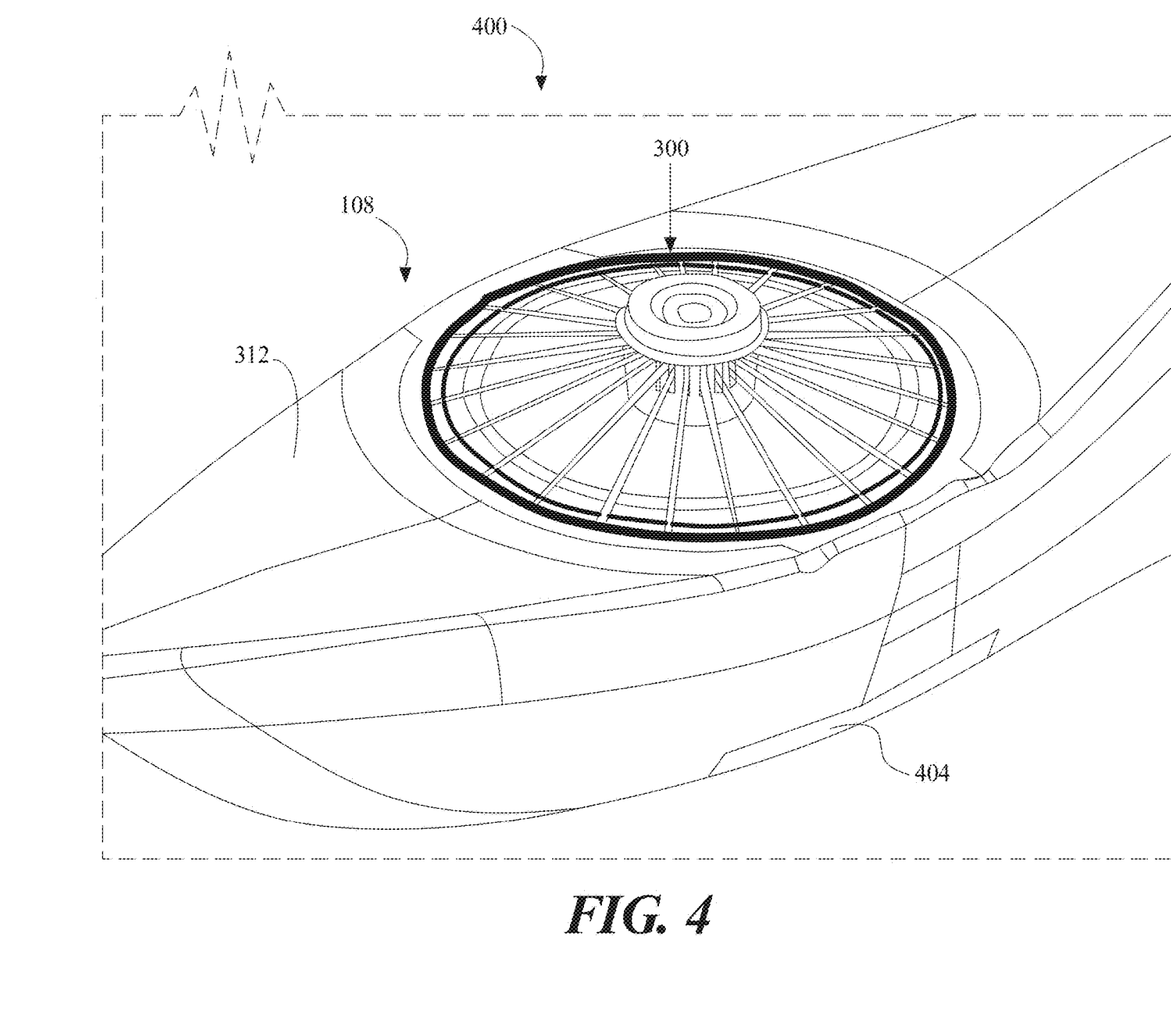
FIG. 4 is an illustration of an exemplary embodiment of a closeup view of a motor assembly in a boom.

Now referring to FIG. 4, a close up view of a motor assembly 400 on a boom 108. Boom 108 comprises an access panel 404, providing access to an inverter. Access panel 404 may comprise of the same material as the fuselage 104, or any other suitable material. Access panel 404 may be attached to the boom 108. Attachment may be accomplished by any feasible means, including without limitation attachment with fasteners such as screws, rivets, or bolts, attachment by adhesion, attachment by welding, or the like. Access panel 404 may be used to conduct maintenance on an inverter, or the like.

Continuing to reference FIG. 4, boom 108 can protect motor assembly 400 from damage. Damage on the motor assembly 400 and aircraft may be caused by, but not limited to, torque created by a rotor 316, vibrations from the motor assembly, and/or environmental factors such as weather. Boom 108 may absorb torque exerted by the rotation of the rotor 316 by using bearing cartridge 240. Bearing cartridge 240 may be attached to boom 108 such that it transfers torque from the motor to the boom. Torque may be a measure of force that causes an object to rotate about an axis in a direction. Bearings may transfer loads between rotation and stationary members, allowing the boom 108 to protect the aircraft 100 from damages from torque. In another embodiment, boom 108 may protect aircraft 100 from moment generated by a mating flange 328. Mating flange 328, attached to the stator 204, may contain moment along an axis of a shaft. Boom 108 may counteract the moment using the mating surface 332. This may help prevent damages to the motor assembly 400. In another embodiment, boom 108 may protect motor assembly from vibrational forces. A "vibration" as used in this disclosure is an oscillation about an equilibrium point of an object. Boom 108 may dampen the vibrations from the motor assembly such that they do not affect the aircraft 100. In another embodiment, boom 108 protects the motor assembly 200 from environmental damages. Motor assembly is enclosed within the boom 108 such that the boom acts as a shield from the environmental elements such as weather, debris, and the like.

Figure 5:
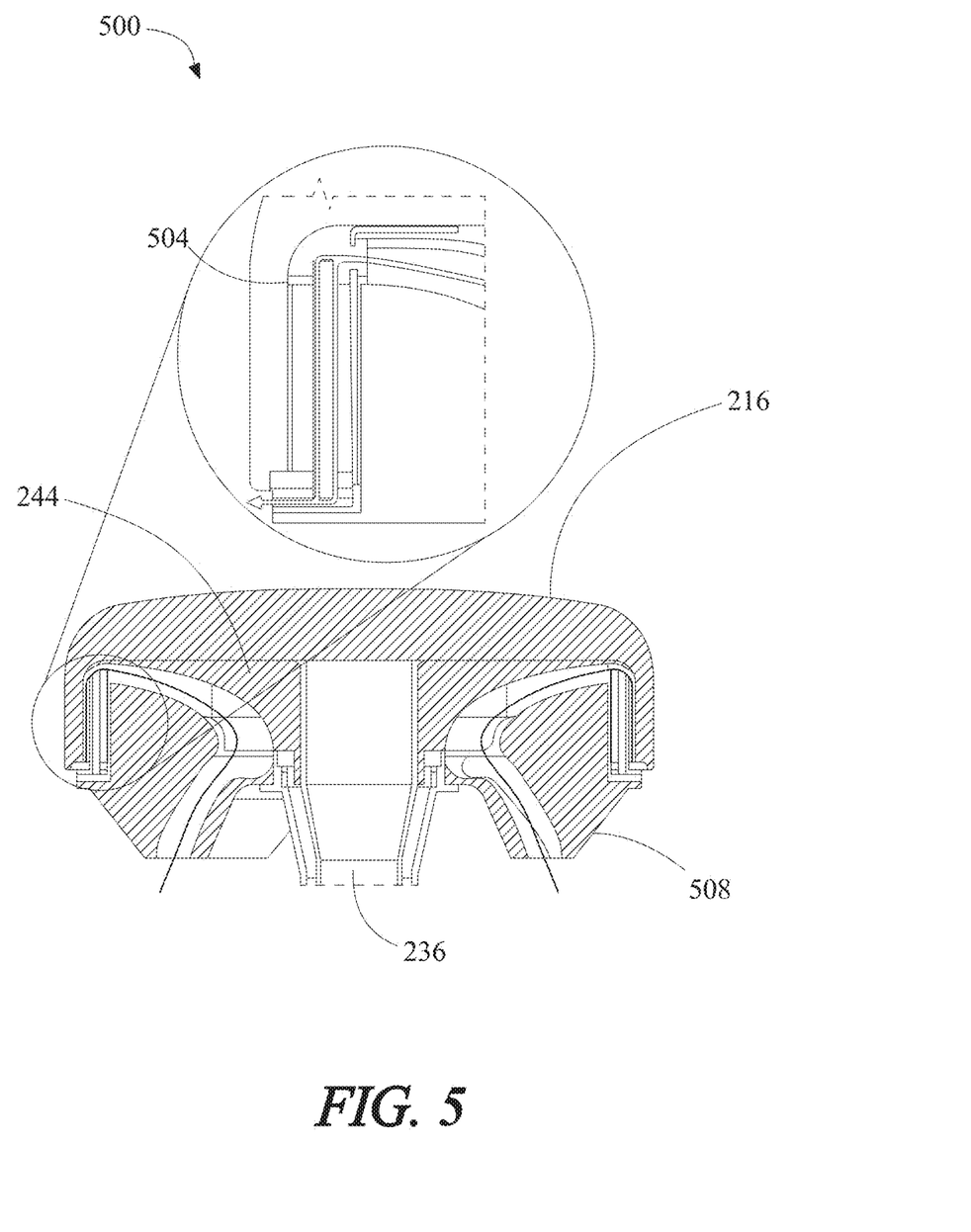
FIG. 5 is an illustration of an exemplary embodiment of a cooling apparatus.

Referring now to FIG. 5, aircraft 100 may include a cooling apparatus 500. Cooling apparatus 500 may function to cool components of the integrated electric propulsion assembly during operation. Cooling may help to protect internal and external components of assembly from fatigue resulting from loads places during operation. During operation, components may become heated due to use, friction, current flow. Cooling apparatus 500 may be a device which has a volume of liquid which provides cooling. Cooling apparatus 500 may be a device which uses airflow to provide cooling. Cooling apparatus 500 may include channels and ducts to allow air from the environment into the integrated electric propulsion assembly. Cooling apparatus 500 may include an impeller 244; impeller 244 may function to direct air flow to cool integrated electric propulsion assembly components. Impeller may be integrated into stator 204 and hub 216 and may include a gap 504. Gap 504 may exist between the inverter housing, impeller 244 and stator 204 allow cooling air to flow through electric propulsion assembly during use. Gap 504 may be a duct, channel, gap such as the motor rotor-stator gaps, or the like.

Still referring to FIG. 5, electric propulsion assembly may include an interior space in hub 116. In an embodiment, impeller 244 may be inserted into the interior space. Interior space may include an inverter space 508. In an embodiment, impeller 244 internally installed in assembly may drive air through finned passageways in the inverter housing and through the motor rotor-stator gaps. This may remove liquid cooling requirements from a cooling element which in turn may reduce the thermal infrastructure and reduce system weight. Impeller 244 may act as a nearly passive cooling element, drawing minimal power from the motor by making use of the existing rotation of the propeller. Impeller 244 may also act as a structural element to provide rigidity in the propeller-prop shaft interface. This design may optionally include a fairing at the base of the inverter housing, to direct ambient air to the inlets in the inverter housing, as well as increasing aerodynamic performance in forward flight by blending the inverter housing to the surrounding structure. A portion of cooling apparatus 500, such as without limitation impeller, may be mechanically coupled to hub 216. Cooling apparatus 500 may include a bore which fits propulsor shaft 236 and into the interior space of hub 216. Cooling apparatus 500 and/or impeller may function to generate an air flow within the interior space when hub 216 rotates.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve embodiments according to this disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A vertical takeoff and landing aircraft, the aircraft comprising:
    a fuselage;
    a wing that extends laterally from the fuselage;
    a boom attached to the wing at a location spaced from the fuselage, wherein the boom is oriented substantially parallel to the fuselage, the boom configured to house a lift motor therein, the lift motor comprising:
        a stator mounted in a fixed position relative to the boom, the stator comprising a plurality of windings having a plurality of end turns;
        a rotor located substantially coaxially with the stator, the rotor comprising a rotor cylindrical surface, wherein the rotor is configured to rotate relative to the stator;
        an air passage configured to:
            receive an airflow from an inlet on a surface of the boom;
            direct the airflow adjacent at least a portion of the plurality of windings; and
            deliver the airflow to an outlet in the boom; and
        a shaft operatively connected to the rotor, the shaft configured to rotate with the rotor, wherein the rotor further comprises a plurality of spokes, each spoke of the plurality of spokes extends from the shaft to the rotor cylindrical surface; and
    a propulsor affixed to the shaft and configured to produce a lifting thrust.

2. The aircraft of claim 1, wherein the rotor comprises a squirrel cage rotor assembly.

3. The aircraft of claim 1, wherein the lift motor further comprises:
    an impeller coupled to the shaft, the impeller configured to draw ambient air into the inlet to generate the airflow.

4. The aircraft of claim 3, wherein the impeller at least partially defines an air gap, wherein the air gap comprises a channel configured to direct the airflow.

5. The aircraft of claim 3, wherein the impeller is disposed within an interior space of a hub of the propulsor.

6. The aircraft of claim 1, wherein the lift motor further comprises:
    an inverter.

7. The aircraft of claim 6, wherein the boom further comprises an access panel, the access panel providing access to the inverter.

8. The aircraft of claim 1, wherein the boom includes a nacelle.

9. A vertical takeoff and landing aircraft, the aircraft comprising:
    a fuselage;
    a wing that extends laterally from the fuselage;
    a boom attached to the wing at a location spaced from the fuselage, wherein the boom is oriented substantially parallel to the fuselage, the boom includes a recess having a lift motor disposed therein, the lift motor comprising:
        a stator mounted in a fixed position relative to the boom, the stator comprising a plurality of windings having a plurality of end turns;
        a rotor located substantially coaxially with the stator, the rotor comprising a plurality of magnets, wherein the rotor is configured to rotate relative to the stator;
        an air passage configured to:
            receive an airflow from an inlet on a surface of the boom;
            direct the airflow adjacent at least a portion of the plurality of windings; and
            deliver the airflow to an outlet in the boom; and
        a shaft operatively connected to the rotor, the shaft configured to rotate with the rotor; and
    a propulsor affixed to the shaft and configured to produce a lifting thrust,
    wherein the lift motor further comprises a mating flange extending radially outward from the stator, the mating flange is integral with the stator.

10. The aircraft of claim 9, wherein the recess comprises a mating surface configured to contact the mating flange.

11. The aircraft of claim 9, wherein the mating flange is configured to resist moment forces applied to the shaft perpendicular to an axis of rotation of the shaft.

12. The aircraft of claim 1, wherein the stator comprises an inner cylindrical surface and an outer cylindrical surface, wherein the inner cylindrical surface and the outer cylindrical surface are centered on an axis of rotation of the shaft.

13. The aircraft of claim 1, wherein the air passage comprises a channel configured to direct the airflow.

14. The aircraft of claim 1, wherein the stator comprises windings, each of the windings having an oval shape that includes opposed end turns.

15. A vertical takeoff and landing aircraft, the aircraft comprising:
    a fuselage;
    a wing that extends laterally from the fuselage;
    a boom attached to the wing at a location spaced from the fuselage, wherein the boom is oriented substantially parallel to the fuselage, the boom configured to house a lift motor therein, the lift motor comprising:
        a stator mounted in a fixed position relative to the boom, the stator comprising a plurality of windings having a plurality of end turns, wherein the stator comprises a first magnetic element configured to generate a first magnetic field;
        a rotor located substantially coaxially with the stator, the rotor comprising a plurality of magnets, wherein the rotor is configured to rotate relative to the stator;
        an air passage configured to:
            receive an airflow from an inlet on a surface of the boom;
            direct the airflow adjacent at least a portion of the plurality of windings; and
            deliver the airflow to an outlet in the boom; and
        a shaft operatively connected to the rotor, the shaft configured to rotate with the rotor; and
    a propulsor affixed to the shaft and configured to produce a lifting thrust; the propulsor comprising:
        a hub; and a second magnetic element affixed to the hub, the second magnetic element configured to generate a second magnetic field, wherein the stator is coupled to the hub using a locking mechanism.

16. The aircraft of claim 6, wherein the air passage is further configured to:

direct the airflow over at least a portion of the inverter.

17. The aircraft of claim 15, wherein the second magnetic element comprises a permanent magnet.

* * * * *